(12) United States Patent
Cheung et al.

(10) Patent No.: US 7,113,543 B2
(45) Date of Patent: Sep. 26, 2006

(54) VIDEO ENCODING

(75) Inventors: Ngai-Man Cheung, Ibaraki (JP); Yuji Itoh, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 473 days.

(21) Appl. No.: 10/356,910

(22) Filed: Feb. 3, 2003

(65) Prior Publication Data

US 2004/0151246 A1   Aug. 5, 2004

(51) Int. Cl.
*H04B 1/66* (2006.01)

(52) U.S. Cl. .......................... 375/240.12; 375/240.16; 375/240.14; 375/240.17; 375/240.24; 348/699; 382/238; 382/236; 382/235

(58) Field of Classification Search ............ 375/240.12, 375/240.16, 240.26, 240.15, 240.24, 240.17, 375/240.14; 382/238, 236, 235; 348/699
See application file for complete search history.

(56) References Cited

U.S. PATENT DOCUMENTS

| 6,526,096 B1 * | 2/2003 | Lainema et al. | 375/240.16 |
| 6,778,606 B1 * | 8/2004 | Kang et al. | 375/240.16 |
| 6,876,703 B1 * | 4/2005 | Ismaeil et al. | 375/240.16 |

* cited by examiner

*Primary Examiner*—Shawn S. An
(74) *Attorney, Agent, or Firm*—Carlton H. Hoel; W. James Brady; Frederick J. Telecky, Jr.

(57) ABSTRACT

Motion compensation as for video compression with motion estimation with either frame mode or field mode by initial prediction of motion mode and when prediction error is small enough truncate motion estimation search.

6 Claims, 11 Drawing Sheets

Block diagram of DCT-based video encoding. Q – Quantization, IQ- Inverse Quantization, ME- Motion Estimation, MC- Motion Compensation, VLC – Variable Length Coding frame     top field (sampled at time T)     bottom field (sampled at time T+ΔT)

field period time interval ΔT

Figure 8a Motion modes (MM) of top-field of current block ($BLK_T$) obtained in MPEG-2 encoding of sequence 'cheer'. MM cluster together roughly corresponding to the objects in the scenes.

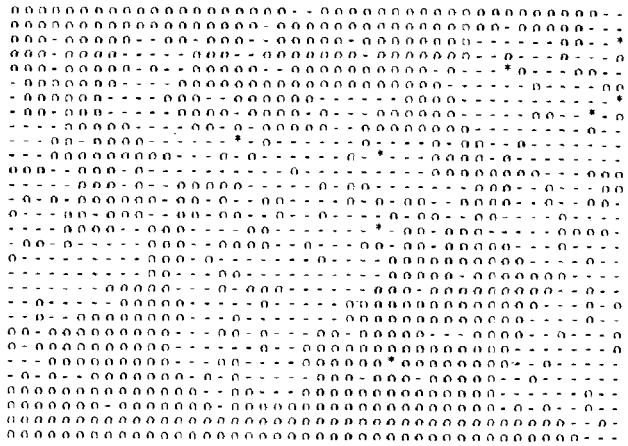

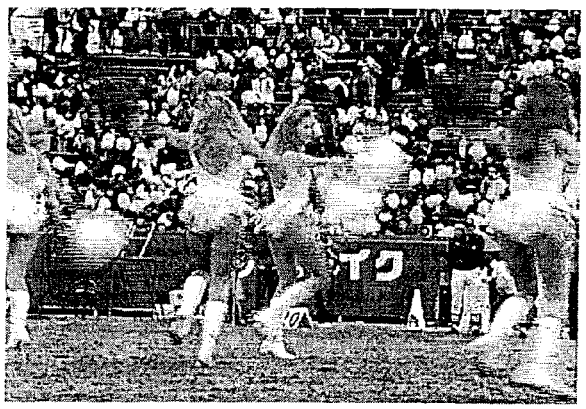

\* : frame prediction;

o : field prediction, prediction from top-field of search window;

- : field prediction, prediction from bottom-field of search window.

Figure 8b A picture in 'cheer' sequence. Motion modes (MM) shown here come from this picture.

Figure 8c Motion modes (MM) of bottom-field of current block ($BLK_B$) obtained in MPEG-2 encoding of sequence 'cheer'. Most MM are the same (prediction from bottom-field of search window).

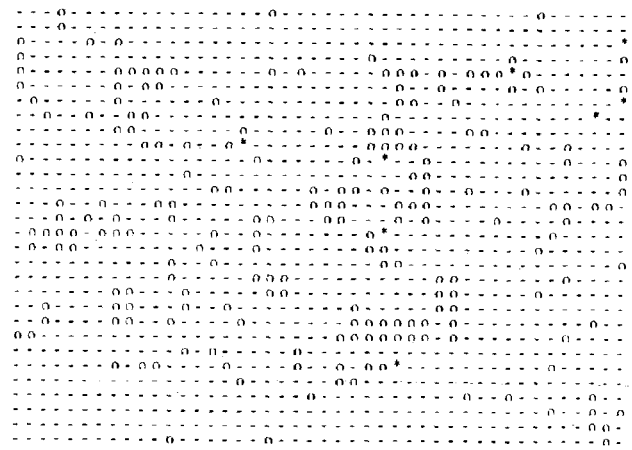

Figure 4. Motion modes (MM) coherence.

Figure 4. Motion modes (MM) coherence.

VIDEO ENCODING

BACKGROUND OF THE INVENTION

The present invention relates to video compression and decompression, and more particularly to motion compensation/estimation methods and systems incorporating such methods.

Many methods exist to compress images/video, such as JPEG and JPEG2000 for still images and H.26x/MPEGx for video sequences. In addition to compressing individual images, video compression also exploits temporal redundancy by using motion compensation.

In block-based compression a picture (frame, image) is decomposed into (macro)blocks where, typically, each macroblock contains a certain number of 8×8 blocks, depending upon the chroma-format used. For example, in the case of 4:2:0 chroma-format a macroblock is made up of four 8×8 luminance blocks (i.e., 16×16 block of pixels) and two 8×8 chrominance blocks (each located as a subsampling of the 16×16 block of pixels).

Motion compensation relates successive pictures in a sequence by block-based motion estimation and prediction. That is, for a block, BLK, in a current (being encoded) picture motion estimation finds a predictive reference block, $BLK_{ref}$, in a prior picture by searching corresponding-sized blocks of pixels, $BLK_k$, in the prior picture and taking $BLK_{ref}=\arg\min_{BLKk}\|BLK-BLK_k\|$ where the distance measure $\|.\|$ can be any convenient metric such as sum-of-absolute-differences (SAD). The reference block can be simply described by the displacement (motion vector, MV) of the location of $BLK_{ref}$ in the prior picture from the location of BLK in the current picture. The prior picture should be a reconstruction of a compressed picture so a decoder will produce the correct result; see FIG. 2 which shows motion compensation (MC) with motion estimation (ME) plus reconstruction that includes block transform (e.g. DCT) and quantization (Q) for further compression and variable length coding (VLC). The search computation can be simplified by restriction to a search window, such as a limit on the magnitude of the motion vector.

Also, in the block-based coding methods, such as H.26x/MPEGx, pictures in a sequence are encoded into one of three picture types: I-pictures (intra-coded), P-pictures (predictive), and B-pictures (bidirectional, interpolative). The coding of an I-picture is independent of other pictures (and thus any image coding method could be applied). A P-picture is first predicted from its reference picture (a previous I- or P-picture) using the macroblock-based forward motion estimation and prediction; then the motion-compensated difference picture (residual/texture) plus the associated motion vectors are encoded. A B-picture has two reference pictures (see FIG. 3), and supports three basic modes: forward prediction, backward prediction, and bi-directional prediction which is a pixel-by-pixel average of the forward and backward predictions.

Further, MPEG2, MPEG4, H.26L, . . . also support interlaced pictures. Each interlaced video frame consists of two fields sampled at different times separated by the field period time interval. The lines of the two fields of a frame interleave so that two consecutive lines of the frame belong to alternative fields. The fields are called the top field (TF) and the bottom field (BF); see heuristic FIG. 4. In particular, if the frame lines are numbered from top to bottom and starting with 0, then the top field consists of the even-numbered lines and the bottom field consists of the odd-numbered lines.

To support interlaced video, MPEG-2 provides a choice of two picture structures: frame picture and field picture. In frame picture each interlaced field pair is interleaved together into a frame that is then divided into macroblocks and encoded. In field picture the top and bottom interlaced fields are encoded separately. Frame picture is more common in consumer products.

MPEG-2 also includes several motion compensation (MC) prediction modes. The two MC prediction modes that are primarily used are frame prediction for frame picture and field prediction for frame picture. In frame prediction for frame picture, the motion estimation (ME) of the current (being encoded) macroblock, BLK, is carried out in the search window, SW, of the reference picture; see FIG. 5*a*. In field prediction for frame picture the current macroblock is split into top-field pixels, $BLK_T$, and bottom-field pixels, $BLK_B$, and ME is carried out separately in the top-field of the search window, $SW_T$, and the bottom-field of the search window, $SW_B$, for both $BLK_T$ and $BLK_B$; see FIG. 5*b*.

To decide upon the optimal coding mode, MPEG-2 motion estimation always has to compute all five possibilities: frame ME of BLK over SW, field ME of $BLK_T$ over $SW_T$ and also over $SW_B$ plus field ME of $BLK_B$ over $SW_T$ and also over $SW_B$. The ME finds the best match reference frame/field block (represented by MV, the corresponding motion vector) and the corresponding prediction error. Prediction errors are usually measured by sum-of-absolute-differences (SAD) defined between M×N blocks $B_1$ of picture p1 and $B_2$ of picture p2 as:

$$SAD(B_1,B_2)=\Sigma_{0\leq i\leq M-1}\Sigma_{0\leq j\leq N-1}|f_{p1}(x_1+i,y_1+j)-f_{p2}(x_2+i,y_2+j)|$$

where $f_p(w,z)$ denotes the pixel value at pixel location (w,z) of picture p, and $(x_1,y_1)$ and $(x_2,y_2)$ are the locations of the upper left corners of blocks $B_1$ and $B_2$, respectively, so the motion vector is $(x_2-x_1,y_2-y_1)$. The x coordinate indicates distance from left to right (column number) and the y coordinate indicates distance from top to bottom (row number).

Using the prediction errors for the five possibilities, the motion estimation decides the motion mode (MM) for the current block, Opt_MM. In the case of a frame picture, MM for the current block can be either frame prediction (FRM_MM) or field prediction (FLD_MM). In the case of Opt_MM equal FLD_MM, motion mode for top field $BLK_T$ (Opt_Field_$MM_T$) can be either TOP or BOT indicating that the prediction is picked from $SW_T$ or $SW_B$, respectively. Similarly, motion mode for bottom field $BLK_B$(Opt_Field_$MM_B$) can also be either TOP or BOT. Note that the motion estimation computations can be full search (examining all possible reference block locations in SW, $SW_T$, or $SW_B$) or any other form of simplified or limited search. Thus for (macro)block BLK in frame picture structure encode the values of variables Opt_MM and, if needed, Opt_Field_$MM_T$ plus Opt_Field_$MM_B$ together with the corresponding motion vector(s), $MV_{FRM}$ or $MV_T$ plus $MV_B$.

The motion estimation is usually the most computationally expensive portion of video encoding. However, different motion estimation designs are allowed in video compression, and they have significant impacts on the cost and quality of the end product. It is a problem to perform motion estimation with low complexity computations while maintaining sufficient picture quality.

An 8×8 DCT (discrete cosine transform) or wavelet or integer transform may be used to convert the blocks of pixel values into frequency domain blocks of transform coefficients for energy compaction and quantization; this permits reduction of the number of bits required to represent the blocks. FIG. 2 depicts block-based video encoding using DCT and motion compensation. The DCT-coefficients blocks are quantized, scanned into a 1-D sequence, encoded by using variable length coding (VLC), and put into the transmitted bitstream. The frame buffer contains the reconstructed prior frame used for reference blocks. The motion vectors are also encoded and transmitted along with overhead information. A decoder just reverses the encoder operations and reconstructs motion-compensated blocks by using the motion vectors to locate reference blocks in previously-decoded frames (pictures).

SUMMARY OF THE INVENTION

The present invention provides motion estimation by motion mode prediction plus threshold acceptance which allows computation reduction.

BRIEF DESCRIPTION OF THE DRAWINGS

The drawings are heuristic for clarity.
FIGS. 8a–8c show motion mode coherence.

DESCRIPTION OF THE PREFERRED EMBODIMENTS

I. Overview

Figure 1A:
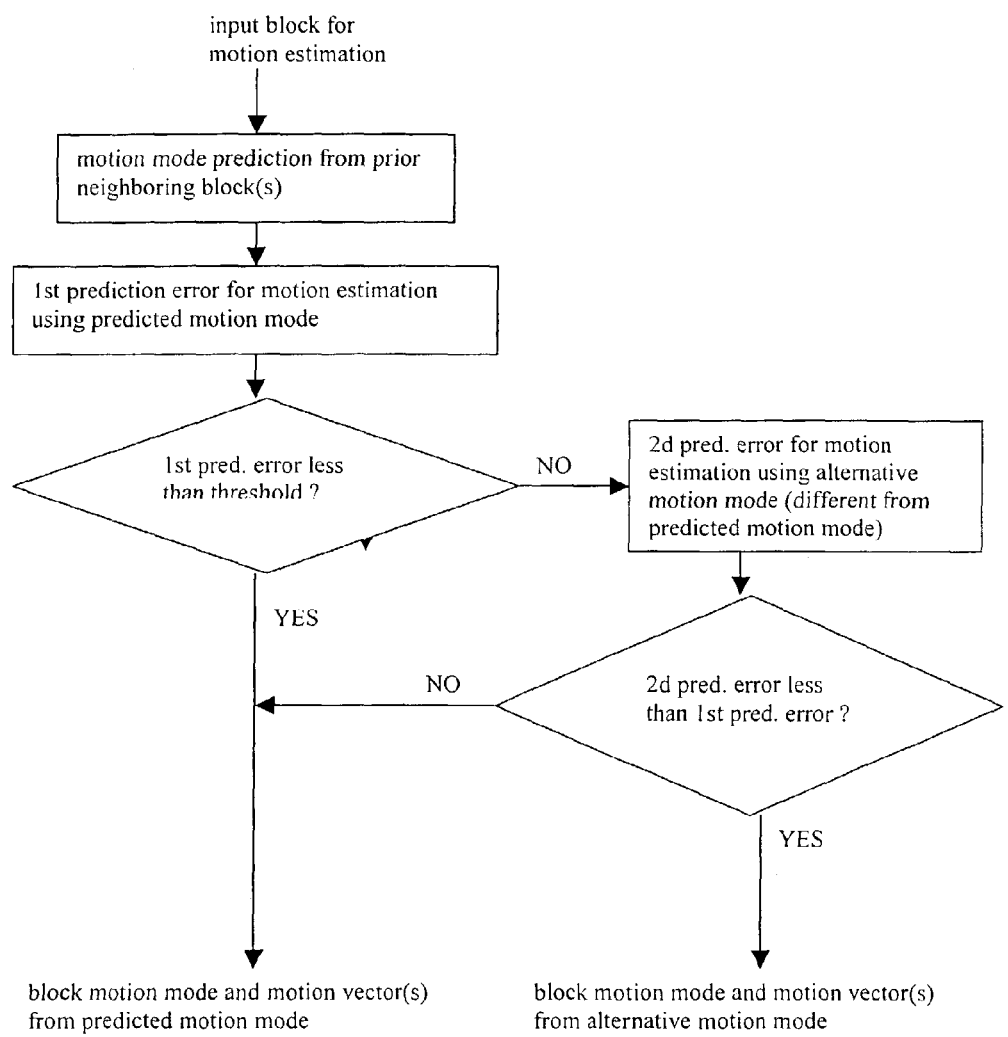
FIGS. 1a–1b illustrate a preferred embodiment method.
Figure 1B:
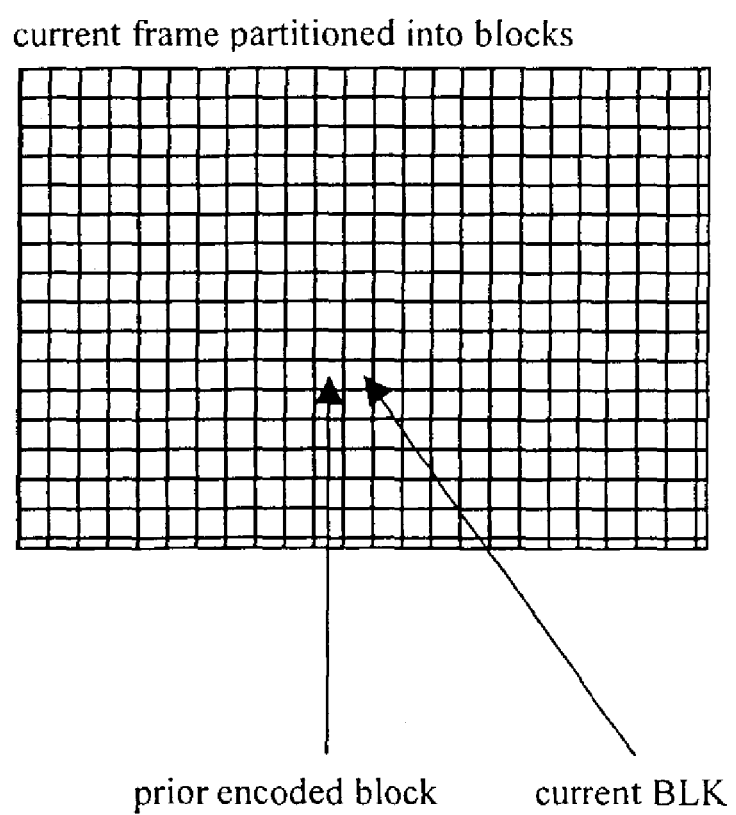
Figure 2:
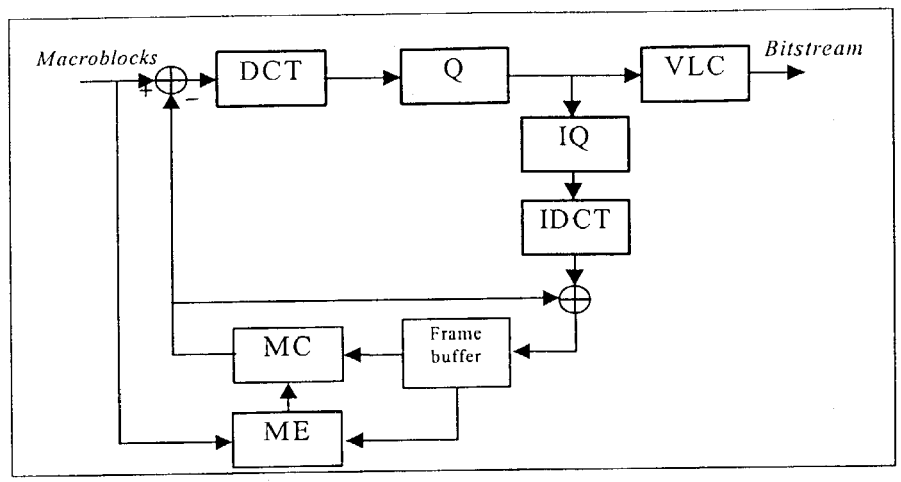
FIG. 2 shows a block-based motion compensation.
Figure 3:
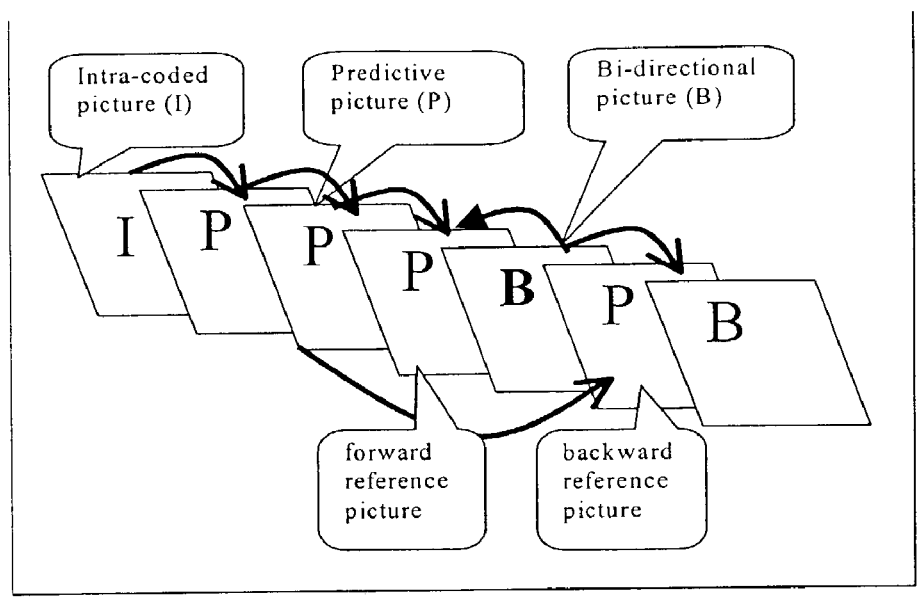
FIGS. 3–5b illustrate aspects of motion estimation.
Figure 4:
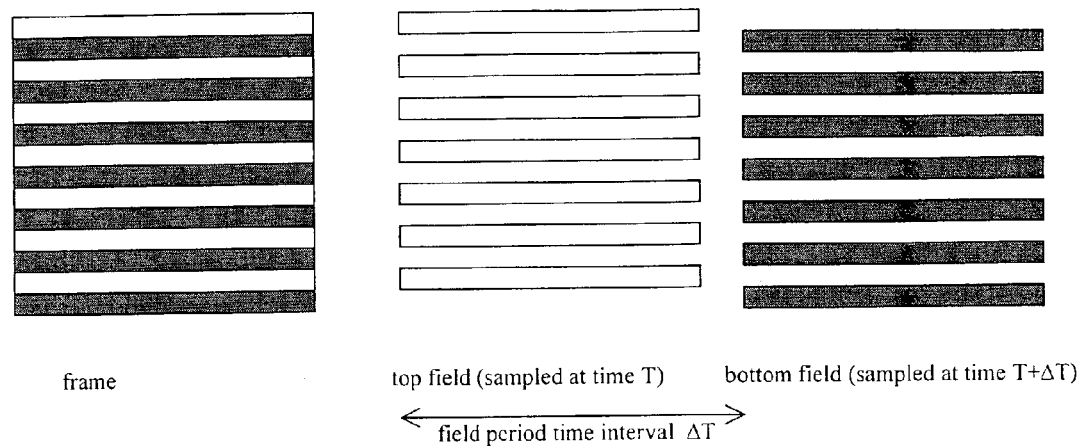
Figure 5A:
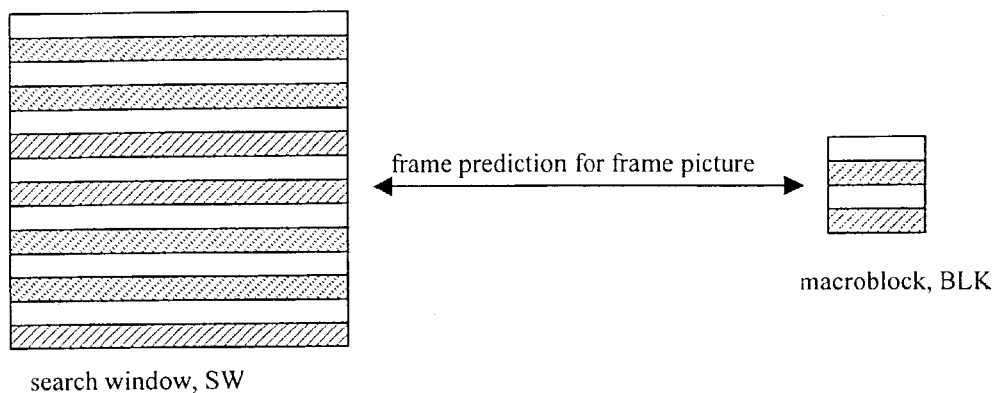
Figure 5B:
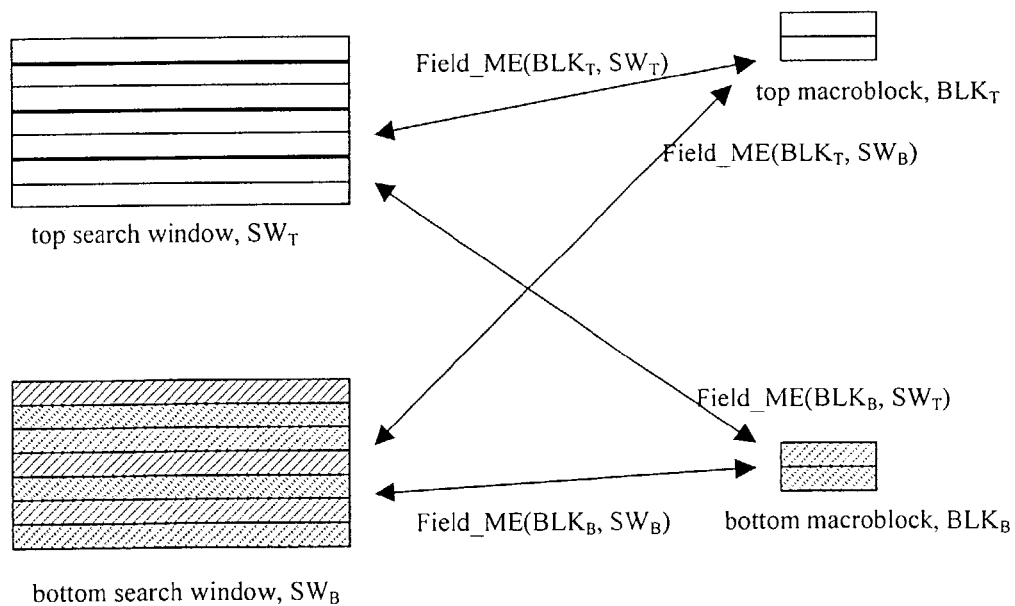

Preferred embodiment methods provide block-based motion estimation with prediction of motion mode (MM) based on a correlation of MMs between neighboring blocks. This allows speed up of the motion estimation searching by starting with the predicted MM for a block and truncating the search once a good-enough result appears. FIG. 1a is a flow diagram, and FIG. 1b show a preceding block used to predict the MM of the current block. FIG. 2 shows an overall encoder which may have the preferred embodiment motion estimation (ME) using MM prediction.

The functions of FIG. 2 using the preferred embodiment methods can be performed with digital signal processors (DSPs) or general purpose programmable processors or application specific circuitry (ASIC) or systems on a chip such as both a DSP and RISC processor on the same chip with the RISC processor as controller. Consumer devices with wireless video capabilities may include further specialized accelerators for JPEG/MPEG/H.26L encoding and decoding and could be added to a chip with a DSP and a RISC processor. And the data processing functions could be a stored program in an onboard or external ROM, flash EEPROM, or ferroelectric RAM for any programmable processors.

II. Full Search Motion Estimation

To describe the preferred embodiment motion estimation methods, first consider the full search ME for a block BLK in more detail. The full search computes all five of the reference possibilities (frame block reference, top field block references in both top field and bottom field search windows, and bottom block references in both top field and bottom field search windows) and selects the optimal motion mode by minimizing the prediction error as in the following steps for a 16×16 macroblock BLK in the current frame being encoded:

1. Compute SAD(BLK, $B_k$) for all 16×16 potential reference blocks, $B_k$, in the search window, SW, of the reference frame. The minimum SAD value determines the reference block, $BLK_{ref}$, which can be described by its motion vector MV. The function Frame_ME(BLK, SW) performs these computations and returns both the resulting motion vector, $MV_{FRM}$, pointing from BLK to $BLK_{ref}$, and the corresponding prediction error, $MIN\_SAD_{FRM}$ (=SAD(BLK, $BLK_{ref}$)). The prediction error will be used in step 6 to select the motion mode (MM) for BLK.

2. Compute SAD($BLK_T$, $B_k$) for all 16×8 potential reference blocks, $B_k$, in the search window, $SW_T$, of the top field of the reference frame. The minimum SAD value determines the reference top field block which can be described by its motion vector, mv_top; and the minimum SAD value is the prediction error for this reference top field block, min_sad_top. The function Field_ME($BLK_T$, $SW_T$) performs these computations and returns the motion vector and the corresponding prediction error. These will be used in following step 3.

3. Compute SAD($BLK_T$, $B_k$) for all 16×8 potential reference blocks, $B_k$, in the search window, $SW_B$, of the bottom field of the reference frame. Again, the minimum SAD value determines the reference bottom field block which can be described by its motion vector; mv_bot; and the minimum SAD value is the prediction error for this reference bottom field block, min_sad_bot. Again, the function Field_ME($BLK_T$, $SW_B$) performs these computations and returns the motion vector and the corresponding prediction error. Then if min_sad_bot is less than min_sad_top from step 2, take $MIN\_SAD_T$=min_sad_bot and $MV_T$=mv_bot; else if min_said_bot is not less than min_sad_top, take $MIN\_SAD_T$=min_sad_top and $MV_T$=mv_top. $MIN\_SAD_T$ and $MV_T$ will be used in step 6 in determination of MM for BLK.

4. Steps 4–5 are analogs of steps 2–3 with $BLK_B$ in place of $BLK_T$. In particular, compute SAD($BLK_B$, $B_k$) for all 16×8 potential reference blocks, $B_k$, in the search window, $SW_T$, of the top field of the reference frame. The minimum SAD value determines the reference top field block which can be described by its motion vector, mv_top; and the minimum SAD value is the prediction error for this reference top field block, min_sad_top. Again, the function Field_ME($BLK_B$, $SW_T$) performs these computations and returns the motion vector and the corresponding prediction error. These will be used in following step 5.

5. Compute SAD($BLK_B$, $B_k$) for all 16×8 potential reference blocks, $B_k$, in the search window, $SW_B$, of the bottom field of the reference frame. Again, the minimum SAD value determines the reference bottom field block which can be described by its motion vector; mv_bot; and the minimum SAD value is the prediction error for this reference bottom field block, min_sad_bot. Again, the function Field_ME($BLK_B$, $SW_B$) performs these computations and returns the motion vector and the corresponding prediction error. Then if min_sad_bot is less than min_sad_top from step 4, take $MIN\_SAD_B$=min_sad_bot and $MV_B$=mv_bot; else if min_said_bot is not less than min_sad_top, take $MIN\_SAD_B$=min_sad_top and $MV_B$=mv_top. $MIN\_SAD_B$ and $MV_B$ will be used in step 6 in determination of MM for BLK.

6. Compare the prediction error for frame motion mode for BLK ($MIN\_SAD_{FRM}$ from step 1) with the prediction error for field motion mode for BLK (MIN_SAD$_T$+MIN_SAD$_B$ from steps 3 and 5). If MIN_SAD$_T$+MIN_SAD$_B$ is not less than MIN_SAD$_{FRM}$, then take the motion mode for BLK to be frame motion mode (Opt_MM(BLK)=FRM_MM) with motion vector MV$_{FRM}$. Otherwise, take the motion mode of BLK to be field motion mode (Opt_MM(BLK)=FLD_MM) and the motion vector is two 16×8 motion vectors, MV$_T$ and MV$_B$. In this case, designate the field of the reference by Opt_Field_MM$_T$=TOP or BOT according to step 3, and Opt_Field_MM$_B$=TOP or BOT according to step 5. Thus for (macro)block BLK in frame picture structure encode the values of variables Opt_MM and, if needed, Opt_Field_MM$_T$ plus Opt_Field_MM$_B$ together with the corresponding motion vector(s), MV$_{FRM}$ or MV$_T$ plus MV$_B$.

III. Motion Mode Coherence

In contrast to the full search of the foregoing, the preferred embodiment methods of motion estimation simplify the computations by use of a prediction based on motion mode coherence (the correlation of the motion modes of neighboring blocks) together with threshold acceptance of the predicted outcome. The prediction relies on motion mode coherence which has a heuristic basis as follows.

First, consider field mode. For a current top field block, BLK$_T$, the static pixels (e.g., background) will likely correlate better with the pixels in SW$_T$ rather than in SW$_B$ because the pixels of SW$_B$ are offset by at least one line; that is, BLK$_T$ and SW$_T$ have a spatial coherence. Contrarily, the dynamic pixels (e.g., moving objects) of BLK$_T$ likely will correlate better with pixels of SW$_B$ due to SW$_B$ being sampled after SW$_T$ and thus closer in time to BLK$_T$; that is, a temporal coherence. Thus adjacent blocks are likely either both static or both dynamic, so the MM of block BLK$_T$ may be predicted by the MM of its adjacent block(s) which have already been encoded. In other words, if an encoded neighboring block had MM using its SW$_B$, then likely the neighboring block was dynamic and so BLK$_T$ is likely also dynamic and will also have its MM using its SW$_B$.

Analogously, for a current bottom field block, BLK$_B$, the static pixels have spatial coherence with SW$_B$ and the dynamic pixels have temporal coherence also with SW$_B$ again because SW$_B$ is sampled closer in time to BLK$_B$. Hence, again the MM of block BLK$_B$ may be predicted by the MM of its neighboring block(s) which have already been encoded.

Figure 9:
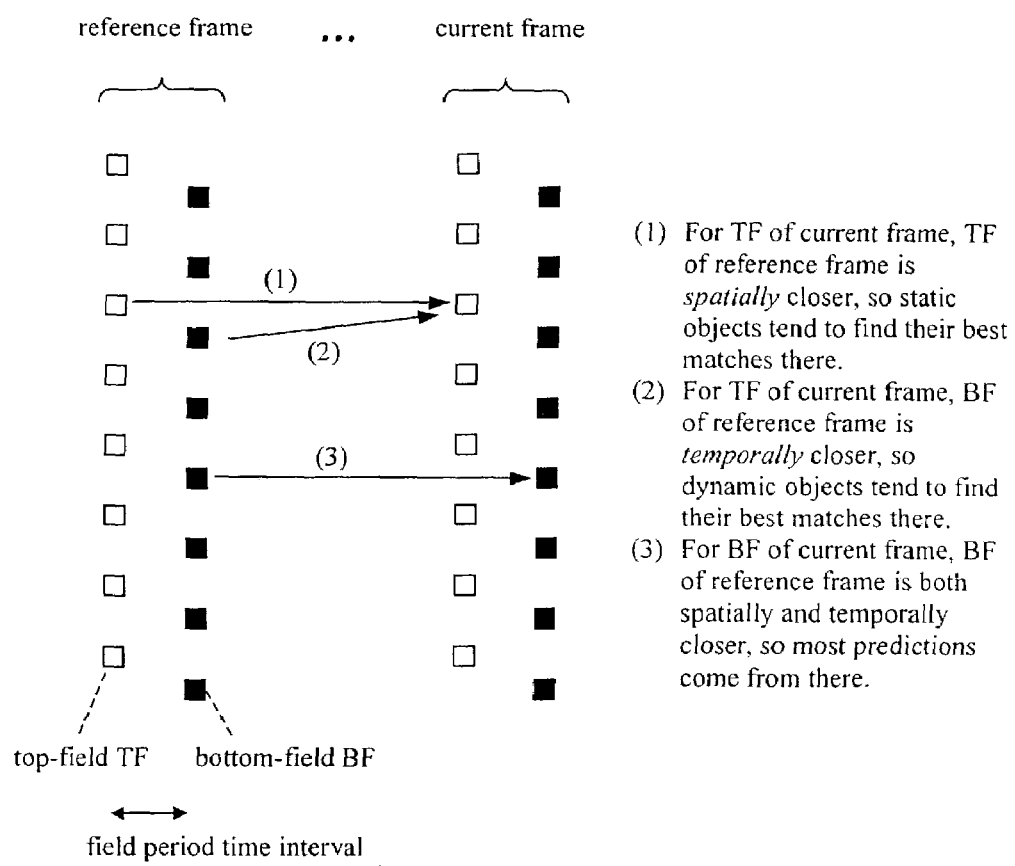
FIGS. 9–10 illustrate preferred embodiment predictions.

FIGS. 8a–8c illustrate experimental support for these heuristic arguments, and FIG. 9 shows the resulting predictions of motion mode.

IV. First Preferred Embodiment Motion Estimation

The first preferred embodiment motion estimation methods for frame picture structure exploit the foregoing motion mode coherence to limit computation by predicting the MM of a current block from the MM of already-encoded neighboring block(s); and if the predicted MM provides a prediction error less than a threshold, then the method truncates the search and adopts the predicted MM and corresponding motion vector(s). That is, even when further searching would yield a smaller prediction error, if the predicted MM provides a good enough prediction error, then it is adopted to limit computational complexity. The first preferred embodiment motion estimation (ME) methods for block BLK (which may be a macroblock in MPEG-2) and include the following steps which, where applicable, use the same variables and functions as in the full search method described in foregoing section II:

1. Predict the motion mode for BLK, Pred_MM(BLK), by taking Pred_MM(BLK)=Opt_MM(Neigh_BLK) where Neigh_BLK is the immediately-preceding block in the same scan line as BLK and Opt_MM is its motion mode (equal to either FRM_MM or FLD_MM). (Neigh_BLK is the block encoded just prior to the encoding of BLK, so the variable Opt_MM applied to Neigh_BLK.) FIG. 1b illustrates a possible neighboring block as a preceding block in the same scan line as the current block BLK. Other neighboring block determinations could be used such as the adjacent block of the preceding scan line. For the case of the MM prediction from a block other than the immediately preceding block, the variable Opt_MM would have to be stored until used for Pred_MM. For example, the first block in a scan line could take its MM prediction from the first block in the previous scan line, so this one Opt_MM would be stored and updated at the start of each scan line.

Figure 6:
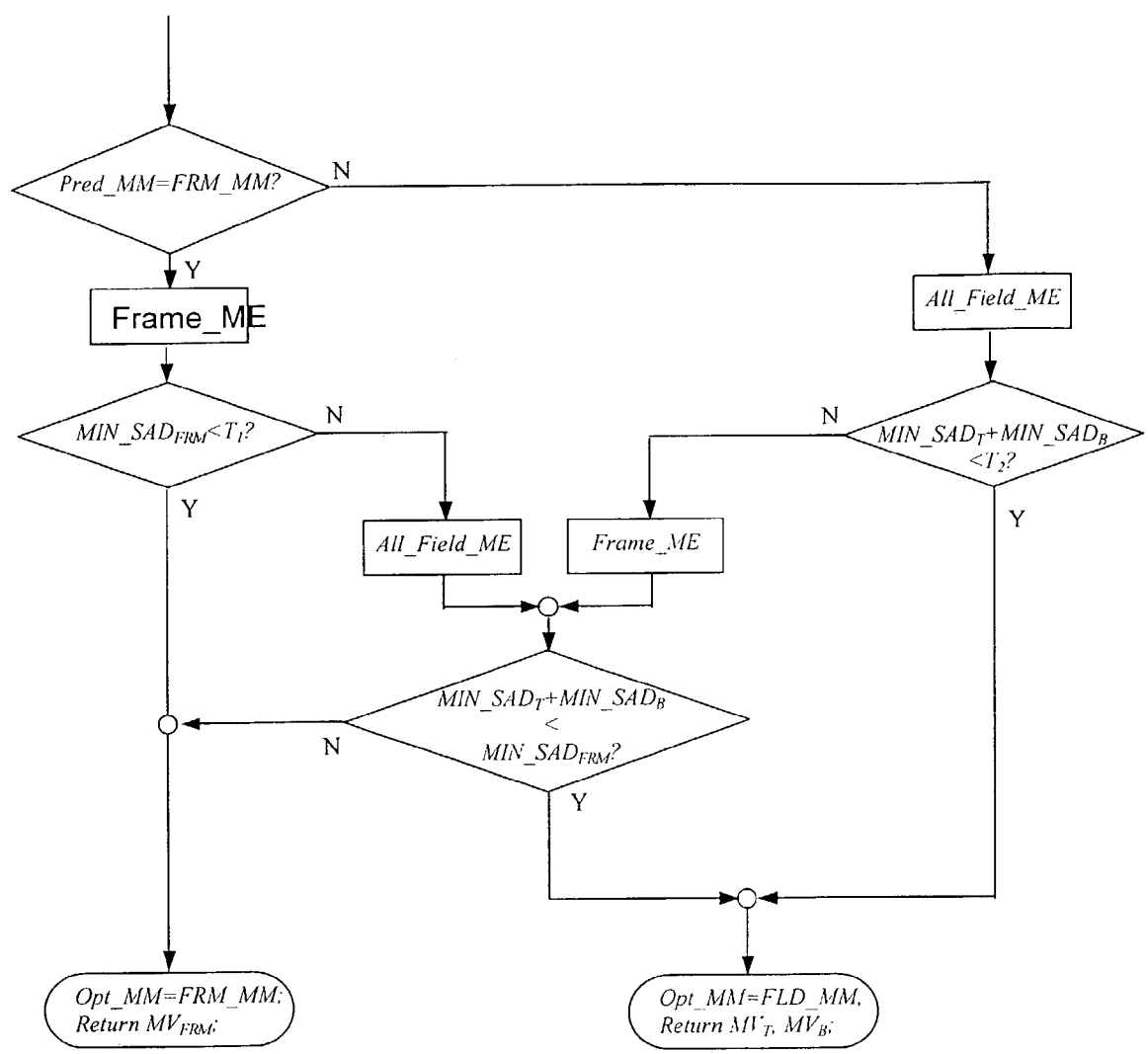
FIGS. 6–7 are flow diagrams of a preferred embodiment method.

2. If Pred_MM(BLK)=FRM_MM, then perform the following steps (a)–(c); else if Pred_MM(BLK)=FLD_MM, then go to step 3. The flow diagram FIG. 6 illustrates this decision in the upper left portion.

(a) Execute Frame_ME(BLK, SW) as described in foregoing section II. This returns the motion vector MV$_{FRM}$ and the corresponding prediction error MIN_SAD$_{FRM}$.

(b) If MIN_SAD$_{FRM}$ from substep (a) is less than threshold T$_1$, then truncate the ME searching, update Opt_MM=FRM_MM, and go to step 4. The left hand portion of FIG. 6 shows this. Note that for pixel values in the range 0–255 and 16×16 pixel luminance (macro) blocks, T$_1$=3000 provides good results.

(c) Else if MIN_SAD$_{FRM}$ from substep (a) is not less than threshold T$_1$, then execute the function All_Field_ME (BLK) illustrated in FIG. 7 and described below which essentially performs Field_ME (described in foregoing section II) for both BLK$_T$ and BLK$_B$ with, possibly both, field search windows SW$_T$ and SW$_B$. All_Field_ME updates both Opt_Field_MM$_T$ and Opt_Field_MM$_B$ and returns both MIN_SAD$_T$ and MIN_SAD$_B$ plus corresponding motion vectors MV$_T$ and MV$_B$. Then compare the field prediction error (MIN_SAD$_T$+MIN_SAD$_B$) with the frame prediction error (MIN_SAD$_{FRM}$) from substep (a), if the field prediction error is smaller than the frame prediction error, then update Opt_MM to FLD_MM and output the field motion vectors MV$_T$ and MV$_B$ and go to step 4. (Note that Opt_Field_MM$_T$ and Opt_Field_MM$_B$ have already been updated.) Otherwise, if the field prediction error is not less than the frame prediction error, update Opt_MM to FRM_MM and output the frame motion vector MV$_{FRM}$ and go to step 4. See the center and lower portion of FIG. 6.

In more detail, the function All_Field_ME(BLK) executes the function Half_Field_ME for both BLK$_T$ and BLK$_B$ where the function Half_Field_ME(BLK*) includes the following steps and where * may equal either T or B:

(i) Predict the field MM for BLK* by Pred_Field_MM*=Opt_Field_MM*(Neigh_BLK). Note that Opt_Field_MM*(Neigh_BLK) may not have been updated during motion estimation for Neigh_BLK because Neigh_BLK had frame MM, but the last block to have Opt_Field_MM* updated likely still has some mode coherence with BLK, so this prediction is probably better than random.

(ii) If in preceding (i) Pred_Field_MM*=TOP, execute Field_ME(BLK*, SW$_T$) which returns the minimum 16×8 SAD, min_sad_top, and the corresponding motion vector, mot_vec_top; else if Pred_Field_MM*=BOT, go to step (v) below. See the middle portion of FIG. 7.

Figure 7:
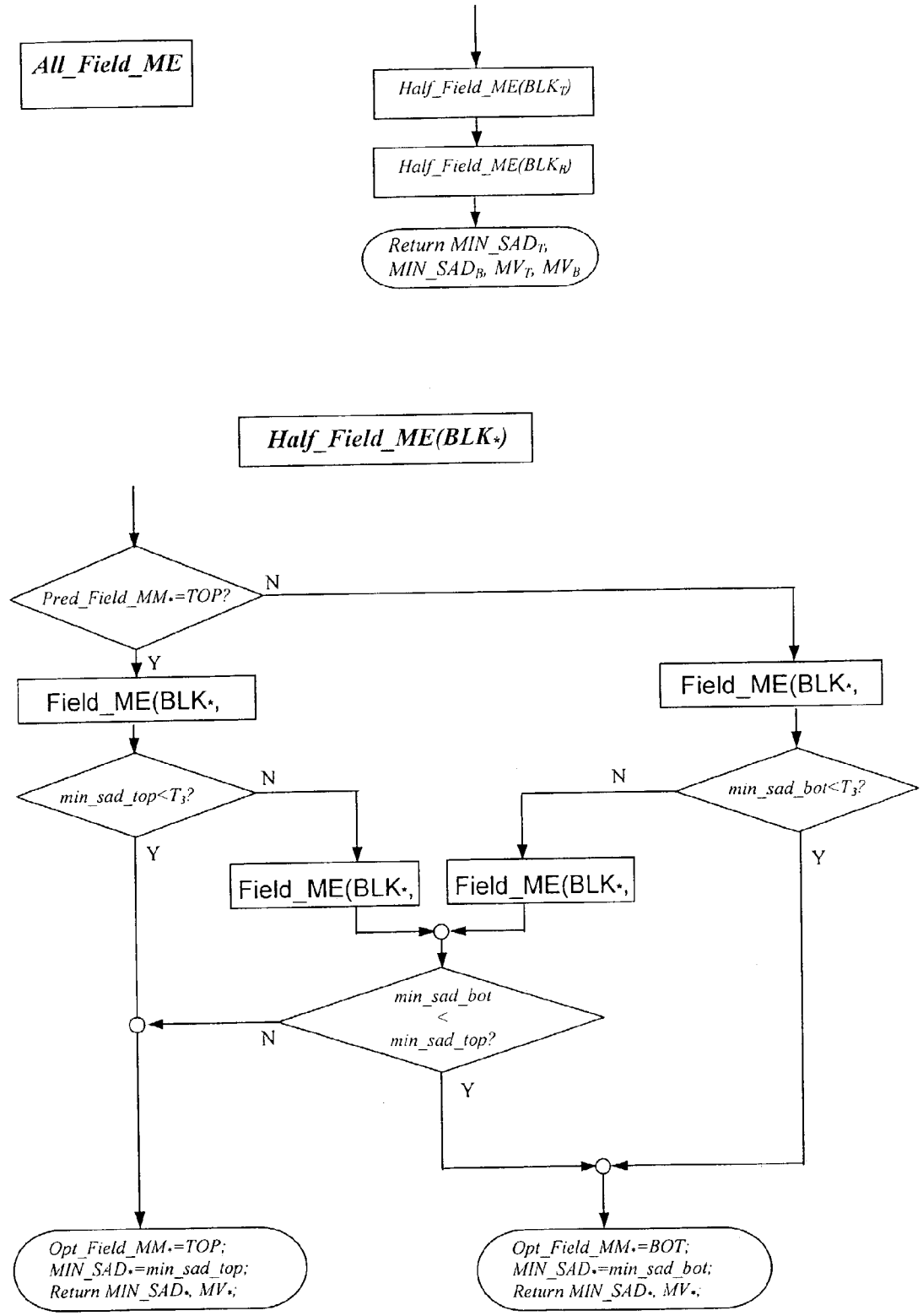

(iii) When min_sad_top is less than threshold $T_3$, truncate the search and update Opt_Field_MM*=TOP, and return MIN_SAD*=min_sad_top plus motion vector MV*=mot_vec_top; see the lower left portion of FIG. 7.

(iv) Conversely, when min_sad_top is not less than threshold $T_3$, then execute Field_ME(BLK*, $SW_B$) which returns the minimum 16×8 SAD, min_sad_bot, and the corresponding motion vector, mot_vec_bot. Next, compare the SADs and if min_sad_bot is less than min_sad_top, then update Opt_Field_MM*=BOT, and return MIN_SAD*=min_sad_bot plus motion vector MV*=mot_vec_bot; otherwise, update Opt_Field_MM*=TOP, and return MIN_SAD*=min_sad_top plus motion vector MV*=mot_vec_top. See the center and lower portion of FIG. 7. Note that $T_3$=1800 provides good results.

(v) Else if in preceding (i) Pred_Field_MM*=BOT, execute Field_ME(BLK*, $SW_B$) which returns the minimum 16×8 SAD, min_sad_bot, and the corresponding motion vector, mot_vec_bot.

(vi) When min_sad_bot is less than threshold $T_3$, truncate the search and update Opt_Field_MM*=BOT, and return MIN_SAD*=min_sad_bot plus motion vector MV*=mot_vec_bot. See right portion of FIG. 7.

(vii) Conversely, when min_sad_bot is not less than threshold $T_3$, then execute Field_ME(BLK*, $SW_T$) which returns the minimum 16×8 SAD, min_sad_top, and the corresponding motion vector, mot_vec_top. Then as in step (iv), compare the SADs and if min_sad_bot is less than min_sad_top, then update Opt_Field_MM*=BOT, and return MIN_SAD*=min_sad_bot plus motion vector MV*=mot_vec_bot; otherwise update Opt_Field_MM*=TOP, and return MIN_SAD*=min_sad_top plus motion vector MV*=mot_vec_top. Again, see the center and lower portion of FIG. 7.

3. Else if Pred_MM(BLK)=FLD_MM, then perform the following steps (a)–(c) which FIG. 6 illustrates in the righthand and center portions.

(a) Execute All_Field_ME(BLK) as described in forgoing step 2; this updates both Opt_Field_$MM_T$ and Opt_Field_$MM_B$ and returns both MIN_$SAD_T$ and MIN_$SAD_B$ plus corresponding motion vectors $MV_T$ and $MV_B$. Then compare the field prediction error (MIN_$SAD_T$+MIN_$SAD_B$) with threshold $T_2$.
   (b) If the field prediction error MIN_$SAD_T$+MIN_$SAD_B$ from substep (a) is less than threshold $T_2$, then truncate the ME searching, update Opt_MM=FLD_MM, and go to step 4. Recall that in substep (a) All_Field_ME had updated both Opt_Field_$MM_T$ and Opt_Field_$MM_B$, and returned motion vectors $MV_T$ and $MV_B$. The right hand portion of FIG. 6 shows this. Note that for pixel values in the range 0–255 and 16×16 pixel luminance (macro)blocks, $T_2$=3000 provides good results.
   (c) Else if the field prediction error MIN_$SAD_T$+MIN_$SAD_B$ from substep (a) is not less than threshold $T_2$, then execute the function Frame_ME(BLK); this returns the motion vector $MV_{FRM}$ and the corresponding prediction error MIN_$SAD_{FRM}$. Then compare the field prediction error (MIN_$SAD_T$+MIN_$SAD_B$) with the frame prediction error (MIN_$SAD_{FRM}$); if the field prediction error is smaller than the frame prediction error, then update OP_MM to FLD_MM and output the field motion vectors $MV_T$ and $MV_B$ and go to step 4. (Note that Opt_Field_$MM_T$ and Opt_Field_$MM_B$ have already been updated.) Otherwise, if the field prediction error is not less than the frame prediction error, update OP_MM to FRM_MM and output the frame motion vector $MV_{FRM}$ and go to step 4. See the center and lower portion of FIG. 6.

4. Encode block BLK by encoding the current value of the variable Opt_MM, and if Opt_MM=FLD_MM then also the current values of the variables Opt_Field_$MM_T$ and Opt_Field_$MM_B$, and the current value(s) of the corresponding motion vector(s), either $MV_{FRM}$ or $MV_T$ and $MV_B$. Lastly, if the neighboring blocks used for MM prediction are more than just the immediately preceding block in the scan line of BLK, then store the value of the variable Opt_MM for later use in MM prediction for subsequent blocks.

V. Field Picture

Figure 10:
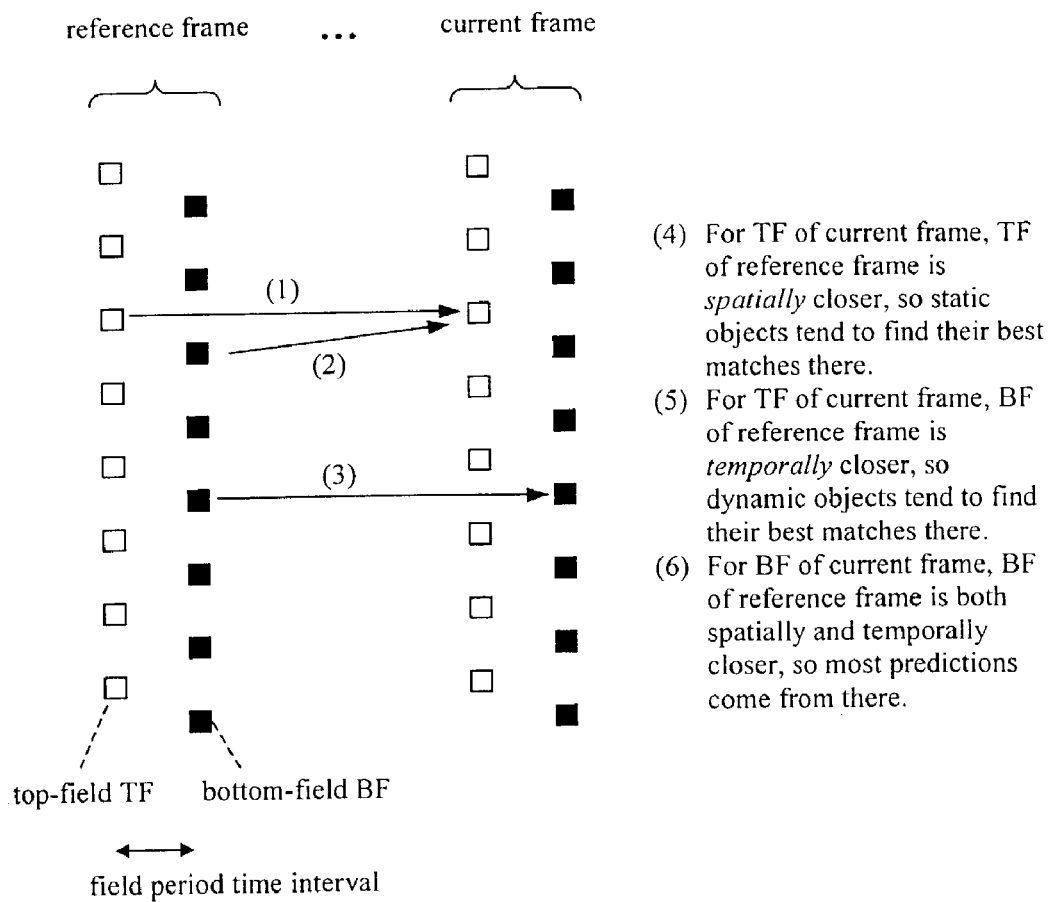

MPEG-2 applications might use the less common field picture structure, where the top field and the bottom field are coded separately. In this case the P-field predictions come from the two most recent reference fields instead of the most recent frame; that is, P-field $BLK_B$ can by predicted by either the bottom field of the prior frame or the top field of the same frame; see FIG. 10. In this case the MM coherence of neighboring blocks still holds. If $BLK_B$ belongs to a static object, it is likely that ME finds the best match in $SW_B$, which is spatially closer. Whereas, if $BLK_B$ belongs to a dynamic object, it is likely that ME finds the best match in $SW_T$, which is in the same frame and hence temporally closer.

The preferred embodiment methods for field picture structure analogously predict the likely reference based on MM coherence, compute the prediction error with this reference field, and truncate searching if the prediction error is less than the threshold; otherwise the prediction error for the other reference field is computed and the smaller of the prediction errors determines the reference field.

VI. Experimental Results

Experiments were run comparing a first preferred embodiment method (prediction from immediately preceding macroblock) with a full search of MMs. The original motion estimation has three steps combined with telescopic search and required $1.8 \times 10^9$ operations per second (GOPS), of which 72% of the total (1.3 GOPS) is due to the second step. As illustrated in Table 1, the preferred embodiment method applied to this second step in six different standard video sequences and reduced the second step computation requirement from 37% to 49% at the expense of negligible 0.034 dB to 0.058 dB in picture quality.

VII. Modifications

The preferred embodiments can be varied in many ways while retaining one or more of the features of predicting the motion mode for a block and accepting this as the motion mode if the corresponding prediction error is small enough.

For example, the values of thresholds $T_1$, $T_2$, and $T_3$ could be varied and changed adaptively based on the previous prediction errors (MIN_$SAD_{FRM}$, MIN_$SAD_T$, MIN_$SAD_B$, min_sad_top, min_sad_bot). Further, the MM prediction for BLK may be from the context of BLK (possibly including prior frames) with already-encoded neighboring blocks weighted with weights determined experimentally and maybe adaptively.

TABLE 1

| | | Proposed | | | |
|---|---|---|---|---|---|
| Sequence | Original Average PSNR-Y(dB) | Average PSNR-Y(dB) | Quality Degradation (dB) | Computation Required (GOPS) | Computation Reduction (%) |
| bicycle | 28.54458667 | 28.51045333 | −0.034133333 | 0.815773696 | 37.24817723 |
| cheer | 29.87749333 | 29.82852667 | −0.048966667 | 0.735902054 | 43.39214966 |
| flower | 30.56235333 | 30.50543333 | −0.05692 | 0.776804403 | 40.24581514 |
| football | 33.85983333 | 33.80134667 | −0.058486667 | 0.790365875 | 39.20262498 |
| mobile | 29.1496 | 29.09351333 | −0.056086667 | 0.652007526 | 49.84557489 |
| tennis | 32.49544 | 32.44497333 | −0.050466667 | 0.698978918 | 46.23239089 |

What is claimed is:

1. A method of video motion estimation, comprising:
   (a) predicting a motion mode for a first block;
   (b) estimating motion of said first block using said motion mode predicted in foregoing step (a);
   (c) when a prediction error of said estimating motion of step (b) is less than a first threshold, using said motion mode predicted in step (a) as the motion mode of said first block and using the results of said step (b) for said first block; and
   (d) when said prediction error of said estimating motion of step (b) is not less than said first threshold of step (c), then
      (i) estimating motion of said first block using a second motion mode, said second motion mode differing from said motion mode predicted in step (a), and
      (ii) when a prediction error of said estimating motion of substep (i) is less than said prediction error of step (b), using said second motion mode as the motion mode for said first block and using the results of said step (i) for said first block;
      (iii) when said prediction error of said estimating motion of substep (i) is not less than said prediction error of step (b), using said motion mode predicted in step (a) as the motion mode of said first block and using the results of said step (b) for said first block.

2. The method of claim 1, wherein:
   (a) said predicting the motion mode of step (a) of claim 1 includes using the motion mode of a second block.

3. The method of claim 2, wherein:
   (a) said second block of claim 2 is a neighboring block of said first block.

4. The method of claim 1, wherein:
   (a) said second motion mode and said motion mode predicted in step (a) of claim 1 are each selected from the group consisting of frame mode and field mode.

5. The method of claim 1, wherein:
   (a) said motion mode predicted in step (a) of claim 1 is frame mode;
   (b) said second motion mode is field mode; and
   (c) said estimating motion of substep (i) of step (d) of claim 1 includes predicting field motion mode for fields of said first block.

6. The method of claim 1, wherein:
   (a) said motion mode predicted in step (a) of claim 1 is field mode;
   (b) said second motion mode is frame mode; and
   (c) said estimating motion of step (b) of claim 1 includes predicting field motion mode for fields of said first block.

* * * * *